3,510,486
HETEROCYCLIC COMPOUNDS
Kenneth H. Rattenbury, Kansas City, Mo., and Edward R. Levy and Ara Zakaryan, Shawnee Mission, Kans., assignors to Chemagro Corporation, New York, N.Y., a corporation of New York
No Drawing. Filed July 27, 1965, Ser. No. 475,245
Int. Cl. C07d 51/78
U.S. Cl. 260—250                          3 Claims

ABSTRACT OF THE DISCLOSURE

Quinoxaline derivatives are prepared by reacting (1) a member of the group consisting of quinoxaline 2,3-dithiol and its carbocyclic aryl ring substitution products wherein the substituents are selected from the group consisting of lower alkyl, halogen, lower alkoxy, aminocarbonyl, aminosulfonyl and carboxyl with (2) an acid halide selected from the group consisting of monocarboxylic acid halide, monothiocarboxylic acid halides, sulfenic acid halides, sulfinic acid halides, sulfonic acid halides, chloroformic acid esters, thiocarboxylic acid ester halides, carbamic acid halides, chlorosulfonic acid esters, chlorosulfonic acid amides, phosgene, thiophosgene, thionyl chloride, sulfuryl chloride and sulfur dichloride under anhydrous conditions and removing the hydrogen halide formed from the reaction zone, the halogen of the hydrogen halide having an atomic weight of between 35 and 80.

---

This invention relates to the preparation of derivatives of 2,3-dimercaptoquinoxalines.

Compounds having good acaricidal and ovicidal effect are obtained by acylation of 2,3-dimercaptoquinoxaline or its substitution products as shown in Sasse Pat. 3,091,-613, May 28, 1963. The entire disclosure of Sasse is incorporated herein by reference.

The acylation is accomplished by using an acid halide with the 2,3-dimercaptoquinoxaline or its nuclear substitution products in the presence of acid binding agents such as alkali metal or alkaline earth metal hydroxides or carbonates, or with tertiary amines.

Morestan (named 6-methyl quinoxaline 2,3-dithiol cyclic carbonate in Chemical Abstracts) having the formula

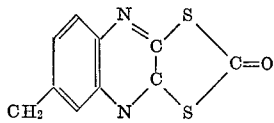

is prepared in Sasse Example 14 14 from 6-methyl-2,3-dimercaptoquinoxaline and phosgene in the presence of sodium hydroxide as an acid acceptor. Morestan is a commercially attractive acaricide and ovicide. Unfortunately, however, the prior art methods for preparing this and related materials are not suited to large-scale commercial operation.

Thus, the common procedure as shown in Sasse is to prepare the sodium salt of 6-methyl-2,3-dimercaptoquinoxaline and react this with phosgene. However, it is difficult and expensive to make the sodium salt anhydrous. This is done by azeotroping and is highly inefficient. The presence of alkali in an aqueous system will cause the phosgene to be destroyed before it acylates.

If instead of making the sodium salt there is employed a tertiary amine as the condensing or acid binding agent, there is an expensive recovery procedure required.

Accordingly, it is an object of the present invention to prepare acylation products of 2,3-dimercaptoquinoxaline and its substitution products in an improved manner.

Another object is to prepare such products in pure form in increased yields.

A further object is to develop a commercially attractive method for preparing 6-methyl quinoxaline 2,3-dithiol cyclic carbonate.

Yet another object is to avoid the disadvantages attendant with the use of alkaline condensing or acid binding agents in preparing the above set forth acylation products.

It has now been found that these objects can be attained by reacting 2,3-dimercaptoquinoxaline or its substitution products as set forth in the Sasse patent under anhydrous conditions with an acylation agent which reacts with the mercapto groups to form hydrogen halide and removing the hydrogen halid formed as a gas. There is no need to employ acid binding agents and the reaction proceeds smoothly. Yield of 90% or more can be obtained by the process. Since no acid binding agent is employed, the problems attendant with the use of such materials are avoided. The reaction can be carried out at widely varying temperatures, e.g., 0–175° C. Proferably the reaction is carried out at an elevated temperature, e.g., under reflux, in an inert solvent such as hydrocarbons and halohydrocarbons, e.g., benzene, toluene, xylene, hexane, heptane, nonane, decane, petroleum ether, aromatic naphtha, octane, naphtha, chloroform, carbon tetrachloride, carbon tetrabromide, ethylene dichloride, ethylene dibromide, ketones, e.g., acetone, methyl ethyl ketone, methyl butyl ketone and methyl isopropyl ketone, dioxane.

As the 2,3-dimercaptoquinoxalines there can be used 2,3-dimercaptoquinoxaline,
6-methyl-2,3-dimercaptoquinoxaline,
6-butyl-2,3-dimercaptoquinoxaline,
5,7-dimethyl-2,3-dimercaptoquinoxaline,
5-methyl-2,3-dimercaptoquinoxaline,
6-chloro-2,3-dimercaptoquinoxaline,
6-methoxy-2,3-dimercaptoquinoxaline,
6,7-dimethyl-2,3-dimercaptoquinoxaline,
2,3-dimercaptoquinoxaline-6-sulfoxamide,
6-amido-2,3-dimercaptoquinoxaline,
6-carboxy-2,3-dimercaptoquinoxaline,
6-N,N-dimethylamido-2,3-dimercaptoquinoxaline,
6-N,N-dimethylsulfoxamido-2,3-dimercaptoquinoxaline and
6-N-phenylsulfoxamido-2,3-dimercaptoquinoxaline.

The acid halides employed can be organic or inorganic. Examples of acid halides are carboxylic acid halides, e.g., benzoyl chloride, benzoyl bromide, acetyl chloride, propionyl chloride, and acetyl bromide, thiocarboxylic acid chlorides, e.g., thioacetyl chloride, sulfenic acid halides, sulfinic acid halides, sulfonic acid halides, e.g., benzene sulfonyl chloride, ethanesulfonyl chloride, toluene sulfonyl chloride, and decane sulfonyl chloride, chloroformic esters, e.g., methyl chloroformate, ethyl chloroformate, alkyl chloroformate, benzyl chloroformate, and phenyl chloroformate, thiocarboxylic acid ester halides, e.g., thiocarbonic acid ethyl ester chloride, carbamic acid halides, e.g., N-phenyl carbamic acid chloride and N,N-dimethyl carbamic acid chloride, thiocarbamic acid halides, e.g., N,N-dimethyl thiocarbamic acid chloride, chlorosulfonic acid esters and chlorosulfonic acid amides.

Bifunctional acid halides containing both halogen atoms attached to the same carbon atom are among the preferred acid halides. These include phosgene, carbonyl bromide, thiophosgene, thionyl chloride, sulfuryl chloride and sulfur dichloride. Phosphorus oxychloride is not suitable for use in the reaction. Each mole of the 2,3-dimercapto-quinoxaline as set forth in Sasse will react with two equivalents of the acyl halide.

Examples of compounds which can be prepared by the present process are 2,3 - bis(ethoxycarbonylthio)quinoxaline having the formula

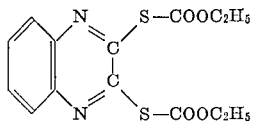

2,3-bis(methoxycarbonylthio)quinoxaline,
2,3-bis(methoxycarbonylthio)-6-methyl quinoxaline,
2,3-bis(ethoxycarbonylthio)-5-methyl quinoxaline,
2,3-bis(ethoxycarbonylthio)-6-methyl quinoxaline,

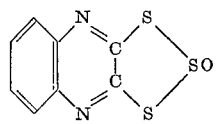

quinoxaline trithiocarbonate having the formula

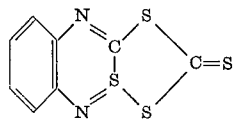

6-methyl quinoxaline trithiocarbonate,

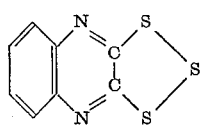

6-chloro quinoxaline trithiocarbonate,
6-methoxy quinoxaline trithiocarbonate,
quinoxaline-2,3-dithiol cyclic carbonate,
5-methyl quinoxaline-2,3-dithiol cyclic carbonate,
6-butyl quinoxaline-2,3-dithiol cyclic carbonate,
6-methyl quinoxaline-2,3-dithiol cyclic carbonate,
2,3-bis(ethoxycarbonylthio)-5,7-dimethyl quinoxaline,
2,3-bis(alkyloxycarbonylthio)quinoxaline,
2,3-bis(phenoxycarbonylthio)quinoxaline,
2,3-bis(phenoxycarbonylthio)-5,7-dimethyl quinoxaline,
2,3-bis(ethoxythiocarbonylthio)quinoxaline,
2,3-bis(N-phenylamidothio)quinoxaline,
5,7-dimethyl quinoxaline-2,3-dithiol cyclic carbonate,
6-methoxy quinoxaline-2,3-dithiol cyclic carbonate,
2,3-bis(benzyloxycarbonylthio)quinoxaline,
2,3-bis(ethoxycarbonylthio)-5-methyl quinoxaline,
2,3-bis(2'-chloroethoxycarbonylthio)-6-methyl quinoxaline,
2,3-bis(methoxycarbonylthio)-5,7-dimethyl quinoxaline,
2,3-bis(ethoxycarbonylthio)-6,7-dimethyl quinoxaline,
2,3-bis(N,N-dimethylamidothio)quinoxaline,
2,3-bis(N,N-dimethylthioamidothio)quinoxaline,
6-aminocarbonyl quinoxaline trithiocarbonate,
6-N,N-dimethylaminocarbonyl quinoxaline trithiocarbonate,
6-aminosulfonyl quinoxaline trithiocarbonate,
6-N,N-dimethylaminosulfonyl quinoxaline trithiocarbonate,
6-N-phenylaminosulfonyl quinoxaline trithiocarbonate,
5-methyl quinoxaline trithiocarbonate,
5,7-dimethyl quinoxaline trithiocarbonate,
6,7-dimethyl quinoxaline trithiocarbonate,
6,7-dimethyl quinoxaline-2,3-dithiol cyclic carbonate,
6-N,N-dimethylaminocarbonyl quinoxaline-2,3-dithiol cyclic carbonate,
6-N,N-dimethylaminosulfonyl-2,3-dithiol cyclic carbonate,
5-carboxyquinoxaline-2,3-dithiol cyclic carbonate, and
2,3-bis(acetylthio)quinoxaline.

Unless otherwise indicated all parts and percentages are by weight.

EXAMPLE 1

A 1 liter flask equipped with agitator, thermometer, gas inlet tube and reflux condenser connected to a caustic trap through a safety flask was charged with 500 ml. of benzene and 41.6 gm. (0.20 mole) of 6-methyl quinoxaline-2,3-dithiol. The mixture was stirred and 22 gm. (0.22 mole) of phosgene was added over 2 hours as the temperature was allowed to rise slowly from room temperature to 35° C. On completion of the addition, the temperature was raised to 50° C. and agitation was continued for 45 minutes. The mixture was then cooled, filtered and the filter cake was slurried in hot benzene to dissolve any precipitated condensation product. The benzene filtrate was then steam stripped to leave a yellow solid which was filtered off and dried, weight 44.7 gm. of 92.8% pure 6-methyl quinoxaline - 2,3 - dithiol cyclic carbonate, corresponding to a net yield of 88%.

EXAMPLE 2

The procedure of Example 1 was repeated but the phosgene was replaced by 0.43 mole of thiophosgene to produce 6-methyl quinoxaline trithiocarbonate in similar yield.

EXAMPLE 3

The procedure of Example 1 was repeated but the 6-methyl quinoxaline-2,3-dithiol was replaced by 0.20 mole of quinoxaline-2,3-dithiol to produce quinoxaline-2,3-dithiol cyclic carbonate in similar yield.

EXAMPLE 4

The procedure of Example 1 was repeated but the 6-methyl quinoxaline-2,3-dithiol was replaced by 0.20 mole of 5,7-dimethyl quinoxaline-2,3-dithiol and the phosgene was replaced by 0.63 mole of chloroformic acid ethyl ester and the mixture refluxed for 5 hours to produce 5,7-dimethyl-2,3 - bis(ethoxycarbonylthio)quinoxaline in good yield.

EXAMPLE 5

The procedure of Example 1 was repeated replacing the 6-methyl quinoxaline-2,3-dithiol by 0.20 mole of quinoxaline-2,3-dithiol and replacing the phosgene by 0.60 mole of acetyl chloride to produce 2,3-bis(acetylthio)quinoxaline in good yield.

EXAMPLE 6

The procedure of Example 1 was repeated replacing the 6-methyl quinoxaline 2,3-dithiol by 0.20 mole of quinoxaline-2,3-dithiol and replacing the phosgene by 0.43 mole of thionyl chloride to produce

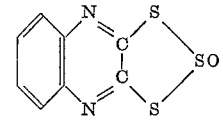

in good yield.

The hydrogen halide which is formed in the reaction is removed as a gas and usually is caught in a caustic trap. To aid in removal of the hydrogen halide nitrogen, helium or other inert gas can be used to sweep the hydrogen halide out of the reaction vessel.

We claim:
1. In a process of preparing 6-methyl quinoxaline-2,3-dithiol cyclic carbonate comprising reacting 6-methyl 2,3- dimercaptoquinoxaline with phosgene under anhydrous conditions the improvement comprising removing the hydrogen chloride formed as a gas.

2. A process according to claim 1 wherein the reaction is carried out in an inert organic solvent.

3. A process according to claim 2 wherein the solvent is an aromatic hydrocarbon at 0–175° C.

References Cited

UNITED STATES PATENTS 3,091,613   5/1963   Stasse et al. _____ 260—250
3,095,413   6/1963   Sasse et al. _____ 260—250

NICHOLAS S. RIZZO, Primary Examiner